United States Patent [19]
Buschur

[11] Patent Number: 6,020,704
[45] Date of Patent: Feb. 1, 2000

[54] WINDSCREEN SENSING AND WIPER CONTROL SYSTEM

[75] Inventor: Jeffrey J. Buschur, Bellbrook, Ohio

[73] Assignee: Valeo Electrical Systems, Inc., Wilmington, Del.

[21] Appl. No.: 08/982,560

[22] Filed: Dec. 2, 1997

[51] Int. Cl.[7] .................................................. G05B 5/00
[52] U.S. Cl. ......................... 318/483; 318/443; 318/444; 318/480; 15/250 C; 15/250.12; 15/250.13; 15/250.17
[58] Field of Search ..................................... 318/483, 444, 318/480, 443, DIG. 2; 15/250 C, 250.12, 250.13, 250.17; 307/9.1, 10.1

[56] References Cited

U.S. PATENT DOCUMENTS

| | | |
|---|---|---|
| 4,463,294 | 7/1984 | Gibson . |
| 4,620,141 | 10/1986 | McCumber et al. . |
| 4,703,237 | 10/1987 | Hochstein . |
| 4,798,956 | 1/1989 | Hochstein . |
| 4,859,867 | 8/1989 | Larson et al. . |
| 4,871,917 | 10/1989 | O'Farrel et al. . |
| 4,916,374 | 4/1990 | Schierbeek et al. . |
| 4,960,996 | 10/1990 | Hochstein . |
| 4,973,844 | 11/1990 | O'Farrell et al. . |
| 5,015,931 | 5/1991 | Muller . |
| 5,059,877 | 10/1991 | Teder . |
| 5,109,797 | 5/1992 | Briant et al. . |
| 5,239,244 | 8/1993 | Teder . |
| 5,276,389 | 1/1994 | Levers . |
| 5,305,311 | 4/1994 | Lyles . |
| 5,313,072 | 5/1994 | Vachss . |
| 5,414,257 | 5/1995 | Stanton . |
| 5,428,277 | 6/1995 | Stanton . |
| 5,560,245 | 10/1996 | Zettler et al. . |

FOREIGN PATENT DOCUMENTS

| | | |
|---|---|---|
| 95109797 | 6/1995 | European Pat. Off. . |
| 95305311 | 7/1995 | European Pat. Off. . |
| 00489063 | 10/1995 | European Pat. Off. . |
| B1 00489063 | 10/1995 | European Pat. Off. . |

OTHER PUBLICATIONS

SAE Technical Paper Series—Method of Evaluating Visibility Provided by Windshield Wipers in Rainy Conditions. By T. Kurahashi, Y. Fukatsu, and K. Matsui. Sep. 23–26, 1995.

Video Rain Sensing Using A Screen, Disclosed anonymously.

SAE Technical Paper Series—The Engineering Resource For Advancing Mobility, "Method of Evaluating Visibility Provided by Windshield Wipers in Rainy Conditions" by T. Kurahashi, Y. Fukatsu and K. Matsui. Dearborn, Michigan—Sep. 23–26, 1985.

*Primary Examiner*—Karen Masih
*Attorney, Agent, or Firm*—J. Gordon Lewis

[57] ABSTRACT

An apparatus for detecting moisture on the windscreen of a motor vehicle has an illumination source and a light sensor mounted within the motor vehicle. The light sensor detects light rays from the light source reflected off the windscreen via a diffusion surface within the motor vehicle. Based upon the sensed reflected light, an image processor in communication with the light sensor creates an image of a portion of the windscreen that the processor analyzes to determine the moisture condition of the windscreen.

A method for controlling the operation of the windscreen wiper system monitors light reflected from a portion of a windscreen and creates an image of the moisture condition of the windscreen based on the reflected light. The image is analyzed to determine the configuration of light intensities in predetermined zones. From the light intensity configuration, the moisture condition of the windscreen is determined. The sensed moisture condition parameters are compared to a threshold array and a signal based upon this comparison is communicated the wiper, defogger, or headlight control system.

27 Claims, 6 Drawing Sheets

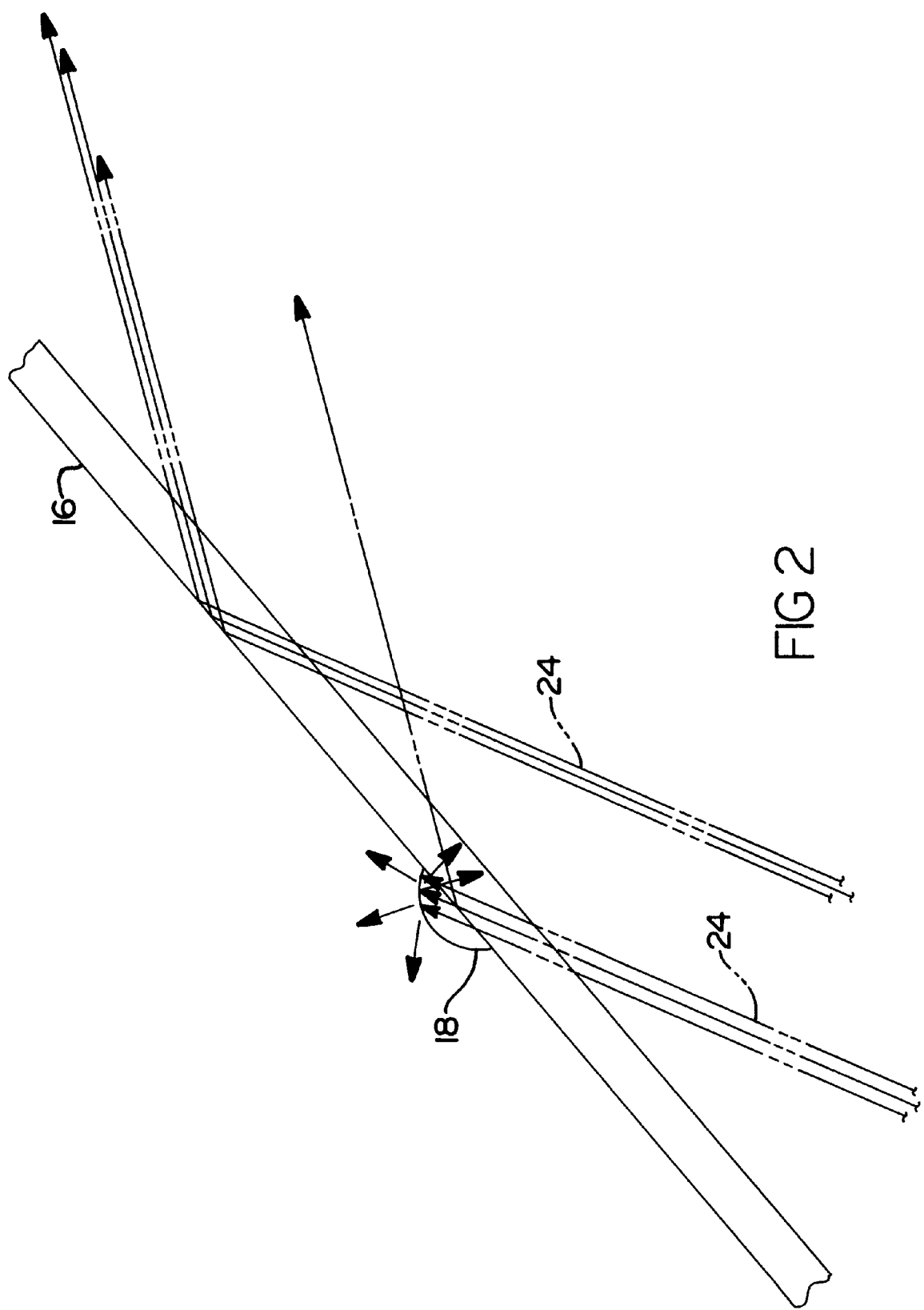

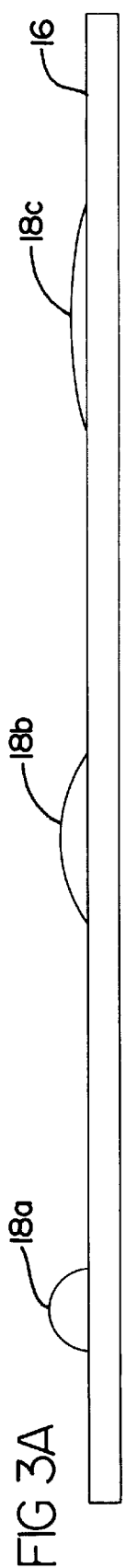
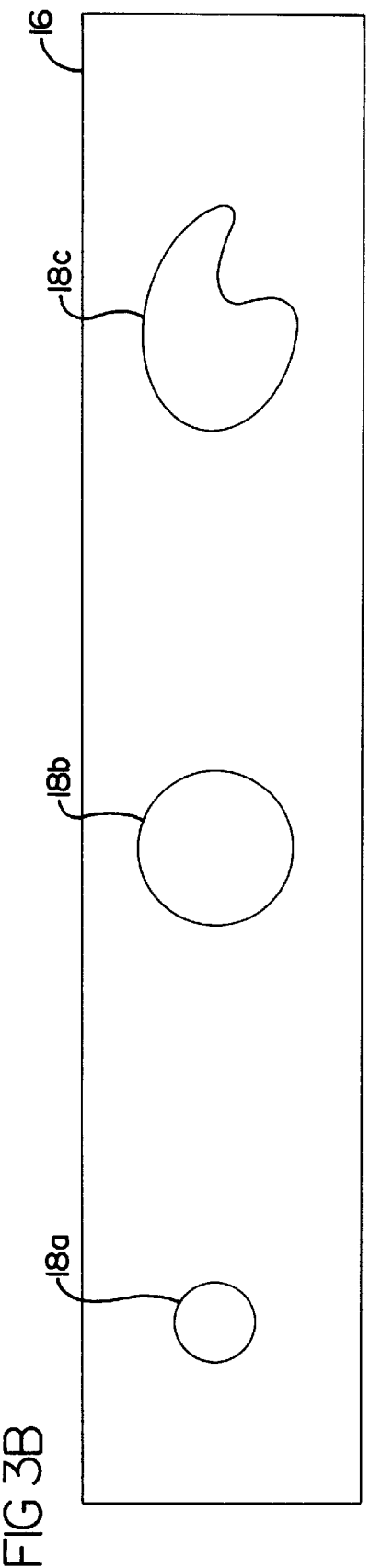
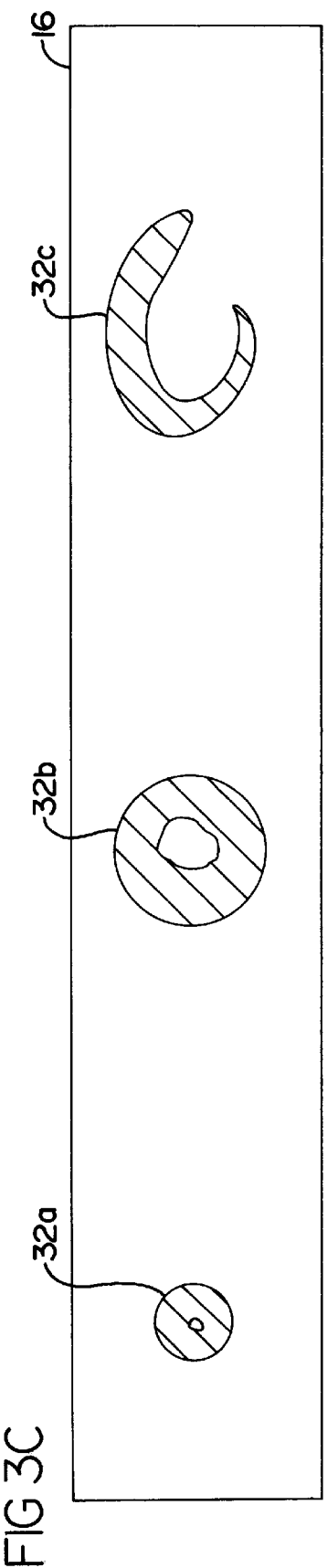
FIG 3A
FIG 3B
FIG 3C

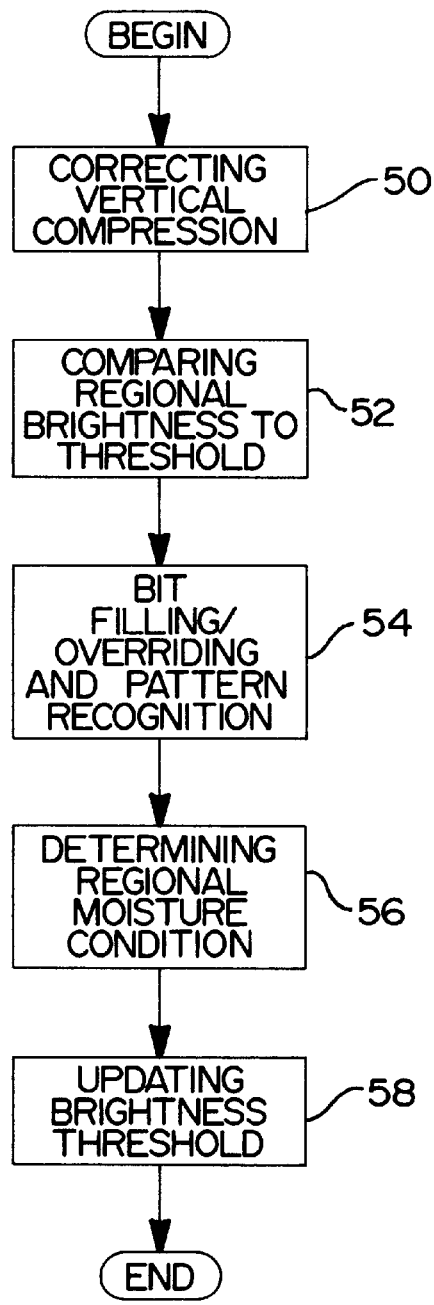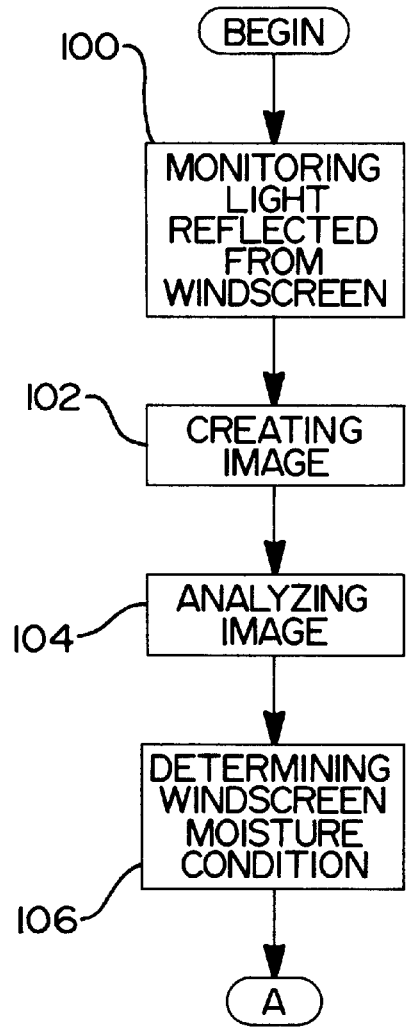

WINDSCREEN SENSING AND WIPER CONTROL SYSTEM

FIELD OF THE INVENTION

The inventive method and system relate to a moisture sensing scheme that utilizes a video array to visually detect environmental conditions on the surface of the vehicle's windscreen (e.g., the presence of moisture droplets) and uses this information to control the vehicle's windscreen wiper, defogging, and headlight systems.

BACKGROUND OF THE INVENTION

Numerous schemes for controlling the actuation of a windscreen wiper employ infrared (IR) emitting diodes and receivers to detect moisture on the surface of the windscreen. Some of these schemes use multiple sender-receiver sets to increase the sensor area and to crudely estimate moisture conditions. The present invention uses a video array or camera to improve the wiper control system's ability to recognize specific visual environmental conditions on the windscreen of a motor vehicle, especially the presence of moisture droplets.

SUMMARY OF THE INVENTION

A system for detecting moisture on the windscreen of a motor vehicle has an illumination source and a light sensor mounted within the motor vehicle. The light sensor detects rays from the light source reflected off the windscreen via a diffusion surface within the vehicle. Based on the reflected light, an image processor in communication with the light sensor creates an image of a portion of the windscreen that the processor analyzes to determine the moisture condition of the windscreen.

A method for controlling the operation of the windscreen wiper system monitors light reflected from a portion of a windscreen and creates an image of the moisture condition of the windscreen based on the reflected light. The image is analyzed to determine the configuration of light intensities in predetermined zones. From the light intensity configuration, the moisture condition of the windscreen is determined. The sensed moisture condition parameters are compared to a threshold array and a signal based upon this comparison is communicated the wiper control system.

BRIEF DESCRIPTION OF THE DRAWINGS

FIG. 2 is a cross-section through the windscreen depicting the diffusion, reflection, and refraction of light through a droplet of moisture on the windscreen.

FIGS. 3A and 3B are elevation and top views, respectively, of a series of various size and shaped moisture droplets.

FIG. 3C is a schematic of dark areas against a backlit field corresponding to the various size and shaped moisture droplets of FIGS. 3A and 3B.

FIG. 4 is a flow chart outlining steps in a method for analyzing an image of a windscreen.

FIG. 5 is a flow chart outlining steps in a method for determining the moisture condition of a windscreen.

DETAILED DESCRIPTION OF THE PREFERRED EMBODIMENT

Figure 1:
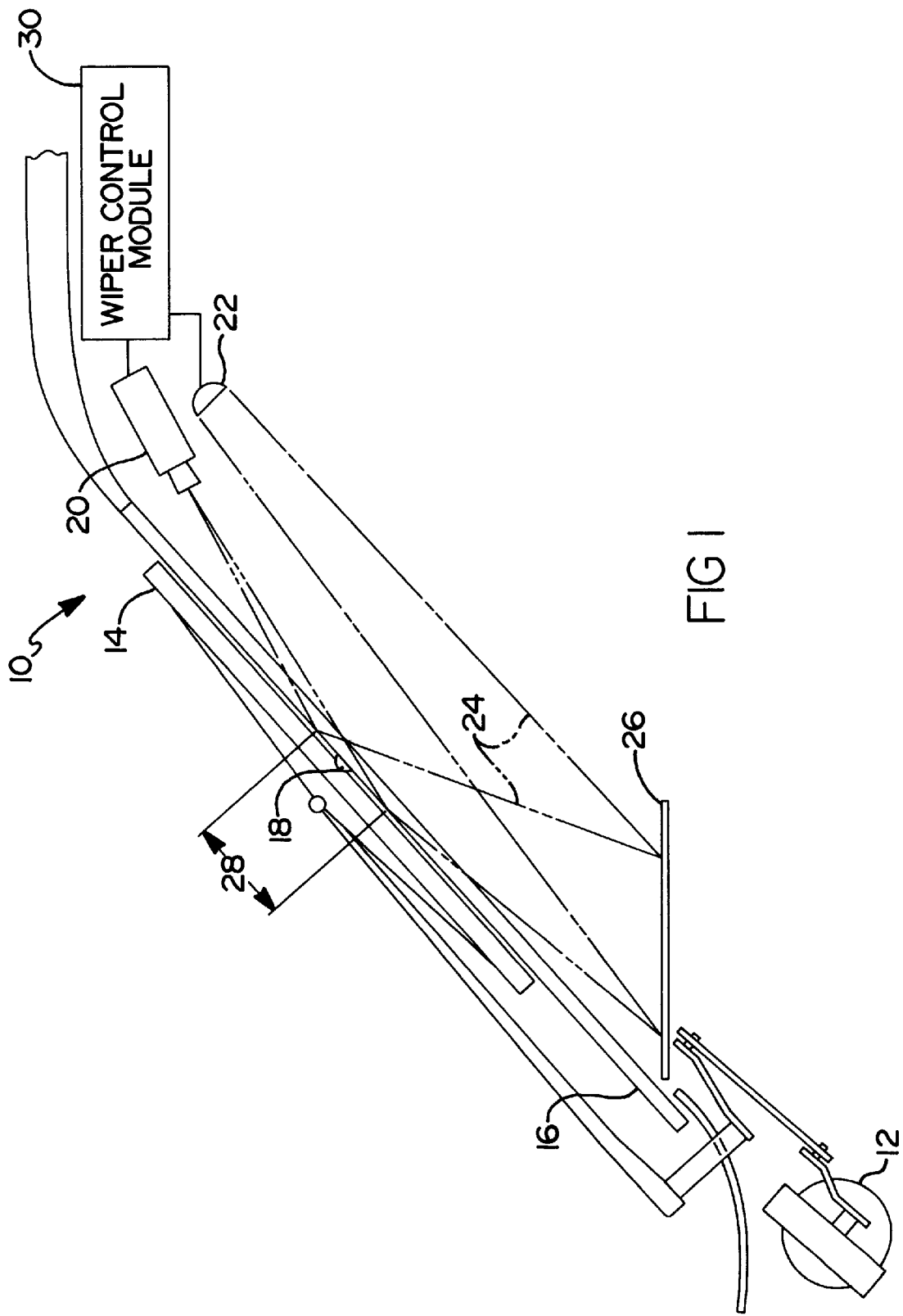
FIG. 1 is a cross-section through the windscreen depicting the windscreen sensing and wiper control system.

Referring to the drawings in which a numeral represents the same component among the several views, FIG. 1 shows a wiper system 10 with a motor 12 that drives a wiper blade 14 across a windscreen 16 of a motor vehicle when moisture droplets 18 are detected on the surface of the windscreen 16. A video camera or light sensing array 20, such as a CCD array, and a light source 22 are mounted high in the interior of the motor vehicle near the top of the vehicle's windscreen 16 in such a way as to prevent saturation of the camera or array 20 from any bright ambient sunlight or from light received directly from the light source 22. To prevent driver annoyance, an infrared (IR) light source such as infrared light emitting diodes may be used as the light source 22. Rays of IR light 24 from the light source 22 are directed downward onto a diffusion surface 26. The diffusion surface 26 is located lower in the interior of the motor vehicle, such as on the top of the dashboard. Light rays 24 reflect off the diffusion surface 26 toward a sensor viewing area $A_s$ 28 located on the back plane of the windscreen 16. To conserve energy and extend the life of light source 22, the light emitting diodes may be pulsed in synchronization with the imaging frequency of the video camera or light sensing array 20. The video camera 20 and the light source 22 communicate with a video image processor and wiper control module 30.

FIGS. 3A and 3B show elevation and top views, respectively, of various size and shaped moisture droplets 18a–18c that may be present on a windscreen 16. The manner in which the light rays 24 reflect from the diffusion area 26 cause these various moisture droplets 18a–18c to appear to the light sensing array 20 that views the sensor viewing area 28 as dark areas 32a–32c against a uniformly backlit field, as depicted in FIG. 3C. As shown in FIG. 2, the dark areas 32a–32c are produced because a certain percentage or portion of the IR light rays 24 that reflect off the diffusion surface 26 that would otherwise bounce off the back plane or sensor viewing area 28 and be received by the video camera 20 at low incident angles is instead dispersed through the curved surface of the moisture droplet 18 on the windscreen 16 and directed away from the video camera 20. Thus, the presence of a moisture droplet 18 is deduced whenever the video camera 20 detects a lower light intensity or dark area 32 that contrasts sharply with surrounding bright dry areas of the windscreen 16.

FIG. 3C shows that the footprint 32a–32c of a moisture droplet 18 of a given volume can vary widely depending on whether the glass windscreen 16 is clean, dirty, or highly waxed due to the difference in the surface energy of the windscreen 16 under these different environmental conditions. A dirty or highly waxed windscreen surface tends to have a low surface energy allowing the moisture droplet 18 to self-adhere, which leads to the more ball-like profile 18a depicted in FIG. 3A. The curved surface of a moisture droplet 18 with a ball-like structure disperses a high percentage of light rays 24 away from the sensing array 20 creating a well defined dark area 32a. However, the lensing effect produced by a moisture droplet 18 coming to rest on dirty or highly waxed glass can cause certain areas within its dark footprint to appear bright, as shown in FIGS. 3C.

Moisture droplets 18 on a very clean windscreen tend to spread creating a droplet 18 with a low profile 18c because the glass attracts water molecules to a greater extent than water molecules attract each other. Different local environmental conditions within a single moisture droplet 18 produce various local surface energies that can lead to an irregular footprint 18c of the type shown in FIG. 3B and produce variable lensing effects that can lead to indeterminate conditions in the video image captured by the video camera or light sensing array 20. The algorithm running in the video image processor and wiper control module 30 compensates for these indeterminate conditions by assuming that pixels above the predetermined threshold are water if they are surrounded by dark pixels or if they are encircled to a great degree, as shown in the various footprints 32a–32c of FIG. 3C.

FIG. 4 outlines the method by which the video image processor and wiper control module 30 determines from the light intensity of a specific zone or number of pixels whether an area being viewed by the light sensing array 20 contains a moisture droplet 18, or is merely the clear glass of the windscreen 16. In step 50, a vertical multiplier ratio is used to correct for the vertical compression of the camera or sensor viewing area 28 by increasing the vertical dimension of any object detected on the sensing area 28. In step 52, the corrected image is compared against a predetermined threshold of brightness (or greyness) to determine whether particular pixels are bright or dark. In step 54, indeterminate conditions are resolved by a bit filling and overriding algorithm. If a bright pixel is surrounded by dark pixels, it is assumed actually to dark and its zero value is replaced by a one.

In step 56, a determination is made as to whether the observed pixels are moisture droplets 18 or the clear glass of the windscreen. In general, all pixels below the predetermined threshold are assumed to be the result of reduced reflected energy and are determined to represent moisture covered glass, while all pixels above the predetermine threshold are assumed to be bright and, therefore, the result of viewing light through the clear glass. This determination is adjusted if the pixel area of the footprint 32 displays any of the characteristic lensing effects described above. Finally, because setting an absolute predetermined threshold of brightness is extremely difficult due to uneven lighting on the diffusion surface 26, in step 58, the preferred embodiment sets a relative threshold of brightness for the next scanning cycle based on the most recent pass of the wiper blades.

The size and position of the camera or sensor viewing area 28 in the present invention was determined using the results of a human factors study conducted for a wiper system 10 with a video video camera 20 as the light sensing array. The study revealed that the percentage of the windscreen glass 16 covered by moisture droplets 18 that a driver will tolerate before actuating the wipers 14 decreases as the size of the moisture droplets 18 increases. In particular, the study revealed that 13% of the driving population would prefer that the wipers 14 actuate before 0.33% of the windscreen glass 16 is covered by water where the moisture droplets 18 are approximately 6.0 mm in diameter. Assuming a 2 square meter windscreen 16, the ideal camera or sensor viewing area 28 can be determined by first determining the number of drops that would have struck the windscreen glass 16 to produce 0.33% moisture coverage using the following equation:

$$N = \frac{A_w \times 0.0033}{\left(\frac{D}{2}\right)^2 \times \pi} \approx 235(\phi 6.0) \text{ drops}$$

Where:
$A_w$=Windscreen area=$2m^2$
$A_s$=Sensor Area
D=Drop diameter

The probability that the sensor viewing area 28 will be struck by this number of randomly placed drops may be calculated using the following equation:

$$P_s = 1 - \left(\frac{A_w - A_s}{A_w}\right)^N$$

If the controller logic is dependent on at least one strike to activate the wipers 14, the probability of obtaining that strike before the desired 0.33% threshold is reached using a sensor viewing area of 75 mm×75 mm is approximately 48%, as shown by the following calculation:

$$P_s = 1 - \left(\frac{2 - 0.075 \times 0.075}{2}\right)^{235} \approx 48\%$$

To increase the probability of the first sensor strike to greater than 90% for the desired threshold of 033%, then a sensor viewing area 28 of approximately 140 mm×140 mm is needed, as shown by the following calculation:

$$P_s = 1 - \left(\frac{2 - 0.140 \times 0.140}{2}\right)^{235} \approx 90\%$$

Previous automated wiper controls employed small sensor viewing areas and relied on the time averaging of as many as ten wipe cycles per strike to maintain wiper pace under large droplet conditions. Furthermore, these systems could not predict the first moisture strike until there was a direct hit within the sensor viewing area. Using a larger sensor viewing area 28 of at least 140 mm×140 mm advantageously permits a wipe frequency of ten wipe cycles per nine droplet 18 strikes to be used. Increasing the sensor viewing area 28 thus permits the system designer to arrive at a well-balanced trade-off between furnishing enough wipe cycles to keep the windscreen clear of moisture, but not so many wipe cycles that the driver becomes annoyed or distracted by the frequency of the wiper actuation or that the wiper blades begin to chatter.

In many driving situations, a driver views a point down the road through as little as one to two square inches of windscreen glass 16. The driver feels a strong need to eliminate any streak or splash that covers this area of the windscreen 16. Consequently, the sensor viewing area 28 is best placed directly in the drivers line of view to respond to the driver's need to keep this small area clean, which results in a one-to-one correlation between the sensor viewing area 28 and driver's viewing area.

Referring now to FIG. 5, the control method active within the video image processor and wiper control module 26 is discussed. In step 100, light rays 24 that reflect from the windscreen 16 of a motor vehicle are monitored by a video camera or light sensing array 20. In step 102, the information gathered by the video camera or light sensing area is communicated to a video image processor and wiper control module 30, which creates an image of the moisture condition on the monitored portion 28 of the windscreen 16 based on the reflected light rays 24. In step 104, the image created in step 102 is analyzed in accordance with the method outlined in FIG. 4 to determine the configuration of the dark areas or light intensity boundaries 32 in predetermined zones of the image. In step 106, the configuration of dark areas 32 contained in the image is used to determine the moisture condition of the windscreen 16. The method continues in step 108 of FIG. 6, where generic parameters related to the number and the size of moisture droplets 18 and the percent moisture on the windscreen 16 developed in accordance with the equations given above are stored in a threshold array within the memory of the video image processor and wiper control module 26 for use in controlling the actuation of the wiper motor 12.

In the alternative, parameters based on individual driver sensitivities may be used in place of generic parameters to populate the threshold array used to determined when to actuate the wiper motor 12. The individual parameters are developed by the permitting the driver to set the module 30 to "learn mode" and manually actuate the wiper motor 12 for a period of time. The module 30 notes which conditions of the windscreen 16 (e.g., at what percentage of windscreen coverage over a range of droplet diameters) trigger the driver to actuate the wipers. From this data, the module 30 populates the threshold array used in step 108 to control actuation of the wiper motor 12. The module 30 can "learn" and store parameter profiles for any number of drivers.

In step 110, the module 30 compares the moisture condition of the windscreen 16 to the threshold array of step 108 and determines whether a threshold has been exceeded. In step 112 of FIG. 6, if the moisture condition exceeds a limit set by the threshold array, the processor within module 30 causes a moisture signal to be sent to wiper system control logic within the module 30. In step 114, the motor is controlled in accordance with the moisture signal issued in step 112.

Figure 8:
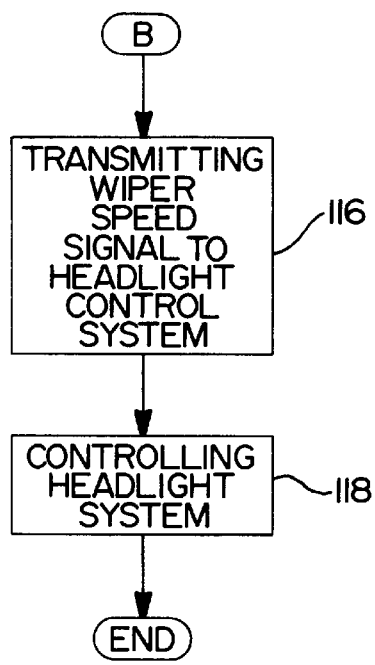
FIG. 8 is a flow chart outlining steps in a method for controlling the headlight system of vehicle.
Figure 9:
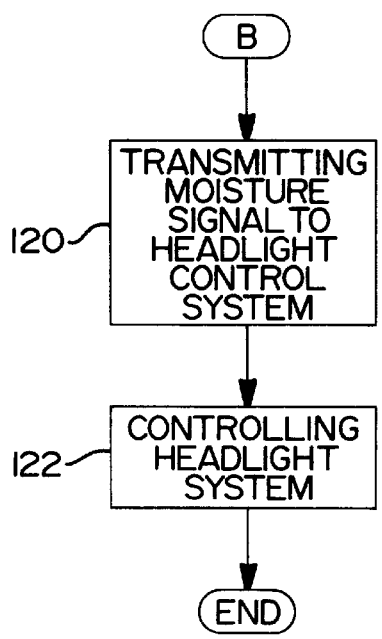
FIG. 9 is a flow chart outlining steps in an alternative method for controlling the headlight system of a vehicle.

In FIGS. 8 and 9, output from the wiper system 10 is used to control the headlights of the vehicle. In step 120 of FIG. 9, module 30 sends a signal based upon the moisture signal (i.e., the results of the comparison of step 110) to the control system for the headlights. In step 120, the headlight control system initiates the change in the headlight system signal, such as turning the headlights on or adjusting the brightness of the headlight, based upon the moisture.

An alternative method for implementing headlight control is outlined in FIG. 8. In step 11, a signal based upon the speed of the wiper operation, rather than the moisture signal itself, is communicated to the control system for the headlights. In step 118, the headlight control system initiates a change in the headlight system, such as turning the headlights on or adjusting the brightness of the headlight, based upon this wiper speed signal.

Figure 6:
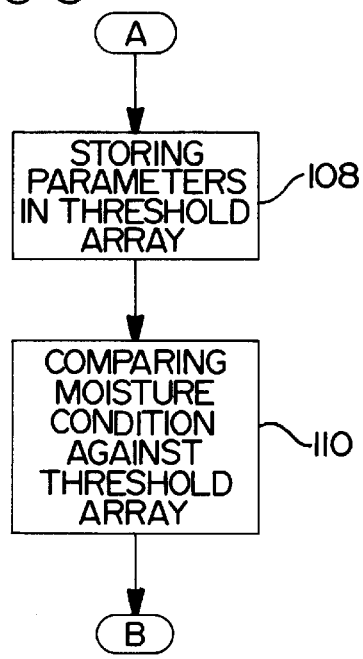
FIG. 6 is a flow chart outlining steps in a method for creating a comparison between the moisture condition of a windscreen and an array of threshold parameters.
Figure 7:
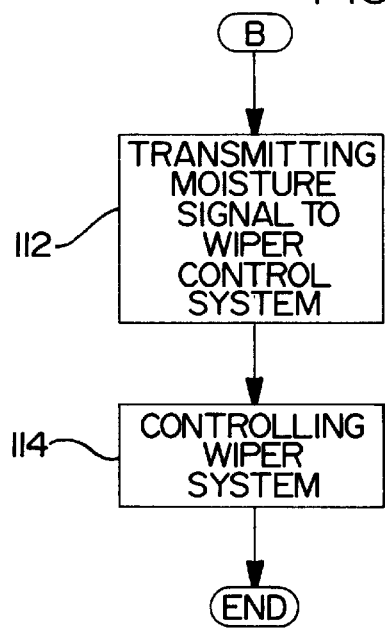
FIG. 7 is a flow chart outlining steps in a method for controlling the windscreen wiper system of a vehicle.
Figure 10:
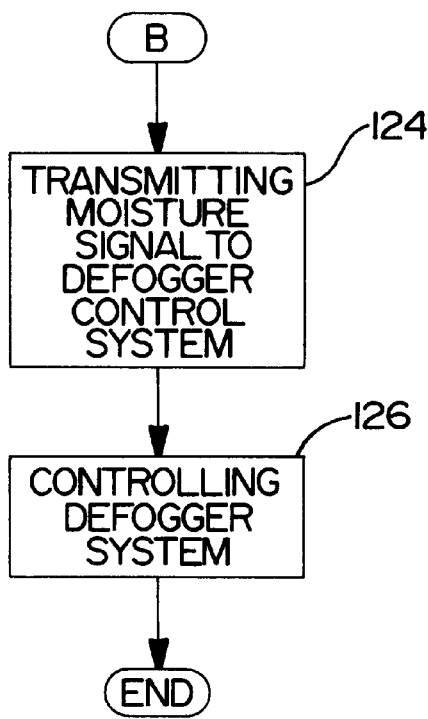
FIG. 10 is a flow chart outlining the steps in a method for controlling the windscreen defogger system of a vehicle.

In FIG. 10, the output from the method of FIGS. 5 and 6 is used to control defogging the windshield 16 and provide input to temperature systems within the vehicle. Defogging and temperature controls are often misunderstood and misused by many drivers. In step 124, module 30 transmits a moisture signal to the defogger control system to initiate defogging operations and set proper temperature control settings for the vehicle.

Figure 11:
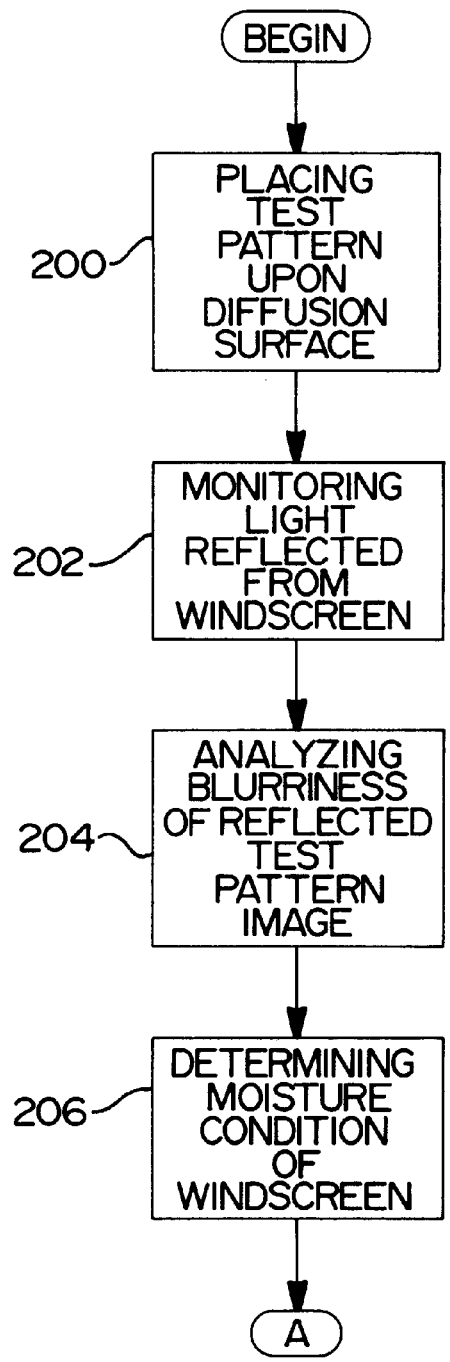
FIG. 11 is a flow chart outlining steps in an alternative method for determining the moisture condition of a windscreen.

In an alternative embodiment of the video array wiper control system 10, a test pattern is imprinted on the diffusion surface 26. The video image processor and wiper control module 30 responds to a sweeping frequency as described in SAE paper 851636. Rather than determining the presence of specific drops of moisture 18 on the windscreen 16, the degree of blurriness of the test pattern is used to determine the moisture signal sent to control the wiper motor 12. The method of operation for this embodiment is outlined in FIG. 11. In step 200, the test pattern is placed upon the diffusion surface 26. In step 202, light rays 24 reflected from the camera or sensor viewing area 28 are monitored by video camera or light sensing array 20. In step 204, the image created by the video image processor and wiper control module 30 from the output of the array 20 is analyzed to determine the degree of blurriness of the test pattern. In step 206, this degree of blurriness is used to determine the moisture condition of the windscreen 16.

The described implementations for sensing the moisture condition on the windscreen of a motor vehicle and using this data to control its wiper, defogger, or headlight systems represent only a few of many possible implementations of the present invention. Alternative and minor variations of the invention that are apparent to those skilled in the art may properly fall within the scope of the claims, which follow.

I claim:

1. An apparatus for a motor vehicle in which a windshield at least partially encloses an interior compartment for housing passengers, said apparatus for detecting moisture on said windscreen, comprising:

illumination source mounted within said motor vehicle;

diffusion surface spaced within said motor vehicle apart from said illumination source, said diffusion surface for reflecting light rays from said illumination source onto said windscreen;

light sensor spaced within said interior compartment apart from said windscreen and said diffusion surface, said light sensor for deflecting light rays reflected from said windscreen; and image processor in communication with said light sensor, said image processor for creating an image representing said moisture on said windscreen based upon input from said light sensor.

2. The apparatus of claim 1, wherein said image processor determines the moisture condition of said windscreen from the intensity of light in predetermined zones of said image.

3. The apparatus of claim 1, wherein said illumination source is a light emitting diode.

4. The apparatus of claim 3, wherein said diode emits light of infra-red frequency.

5. The apparatus of claim 3, wherein said diode pulses in synchronization with the imaging frequency of said light sensor.

6. The apparatus of claim 2, wherein said image processor is in communication with and updates the control system of the windscreen wipers of said vehicle with information regarding said moisture condition.

7. The apparatus of claim 6, herein the operating speed of said windscreen wipers is adjusted based on said information regarding said moisture condition.

8. The apparatus of claim 2, wherein said image processor is in communication with and updates the control system of the defogger system of said vehicle with information regarding said moisture condition.

9. The apparatus of claim 8, wherein the operation of said defogger system is controlled based on said information regarding said moisture condition.

10. The apparatus of claim 6, wherein said image processor is in communication with and updates the control system of the headlights of said vehicle regarding the operating speed of the windscreen wiper system of said vehicle.

11. The apparatus of claim 10, wherein the brightness of the headlights of said vehicle is adjusted based on said operating speed.

12. The apparatus of claim 2, further comprising a test pattern placed upon said diffusion surface.

13. The apparatus of claim 12, wherein said image processor determines said moisture condition from the degree of blurring of said image of said test pattern.

14. A method for analyzing an image of a windscreen of a motor vehicle, comprising the steps of:
    correcting vertical compression of said image;
    comparing the brightness of a region of said image to a predetermined threshold of brightness;
    determining moisture condition of said region based upon the results of said comparing step; and
    updating said predetermine threshold of brightness.

15. A method for controlling the operation of the windscreen wiper system of a motor vehicle, comprising the steps of:
    monitoring light reflected from a portion of a windscreen of said motor vehicle;
    creating an image of the moisture condition on said portion of said windscreen based on said reflected light;
    analyzing said image to determine the configuration of light intensities in predetermined zones of said image; and
    determining from said configuration the moisture condition of said windscreen.

16. The method of claim 15, further comprising the step of:
    storing a predetermined moisture condition profile in a processor; and
    comparing said determined moisture condition to said predetermined moisture condition profile to create a moisture condition comparison.

17. The method of claim 15, further comprising the step of:
    recording droplet size and percent moisture coverage when a driver actuates the wipers of said windscreen wiper system;
    creating a driver parameter preference profile in a processor; and
    comparing said determined moisture condition to said driver preference profile to create a moisture condition comparison.

18. The method of claim 15, further comprising the steps of:
    transmitting a moisture signal based on said moisture condition comparison to the control system of the windscreen wipers of said vehicle; and
    controlling said windscreen wipers based on said moisture command signal.

19. The method of claim 16, further comprising the steps of:
    transmitting a wiper speed signal representing said operating speed of said windscreen wipers to the control system of the headlights of said vehicle; and
    controlling said headlights based upon said wiper signal.

20. The method of claim 15, further comprising the steps of:
    transmitting a moisture signal based on said moisture condition comparison to the control system of said vehicle; and
    controlling the defogger system based on said defogger command signal.

21. The method of claim 15, further comprising the steps of:
    transmitting a moisture signal representing said moisture condition to the control system of the headlights of said vehicle; and
    adjusting the headlights based on said moisture signal.

22. A method for controlling the operation of the windscreen wiper system of a motor vehicle, comprising the steps of:
    providing a diffusion surface spaced within the passenger compartment of said vehicle apart from an illumination source and from the windscreen of said motor vehicle such that at least a portion of light from said illumination source is reflected from said diffusion surface onto said windscreen;
    placing a test pattern upon said diffusion surface;
    monitoring light reflected from said portion of the windscreen;
    creating an image of said test pattern based on said monitored light;
    analyzing said the degree of blurriness of said test pattern in said image; and
    determining from degree of blurriness the moisture condition of said windscreen.

23. An apparatus for detecting moisture droplets on the windscreen of a motor vehicle, comprising:
    a light source mounted within said motor vehicle;
    diffusion surface spaced within said motor vehicle apart from said light source for reflecting light rays from said light source onto said windscreen;
    light sensor spaced within said motor vehicle apart from said windscreen and said diffusion surface for detecting light rays reflected from said windscreen; and
    image processor in communication with said light source and said light sensor for creating an image representing said moisture droplets and creating information regarding the moisture condition of said windscreen based upon said image, and in communication with the windscreen wiper control system of said vehicle for adjusting the operating speed of said windscreen wipers based on said information regarding said moisture condition.

24. The apparatus of claim 23, wherein said image processor determines said moisture condition of said windscreen based upon the intensity of light in predetermined zones of said image.

25. The apparatus of claim 24, further comprising:
    a test pattern placed upon said diffusion surface wherein said image processor determines said moisture condition from the degree of blurring of said image of said test pattern.

26. The apparatus of claim 23, wherein said image processor is in communication with the defogger control system of said vehicle for controlling the operation of said defogger system based on said information regarding said moisture condition, and in communication with headlight control system of said vehicle for adjusting the brightness of the headlights of said vehicle is adjusted based on said operating speed.

27. An apparatus for detecting moisture on the windscreen of a motor vehicle, comprising:
    illumination source mounted within said motor vehicle for transmitting light rays onto said windscreen;
    light sensor spaced within said motor vehicle apart from said windscreen and said illumination source, said light sensor for detecting light rays reflected from said windscreen; and image processor in communication with said light sensor, said image processor for creating an image representing said moisture on said windscreen based upon input from said light sensor.

* * * * *